(No Model.) 8 Sheets—Sheet 1.

J. KENNEDY & H. AIKEN.
HYDRAULIC CRANE.

No. 412,851. Patented Oct. 15, 1889.

(No Model.) 8 Sheets—Sheet 3.

J. KENNEDY & H. AIKEN.
HYDRAULIC CRANE.

No. 412,851. Patented Oct. 15, 1889.

Witnesses
H. L. Gill
E. Newell

Inventors
Julian Kennedy
Henry Aiken
by their attys
Bakewell & Kerr (No Model.) 8 Sheets—Sheet 4.

J. KENNEDY & H. AIKEN.
HYDRAULIC CRANE.

No. 412,851. Patented Oct. 15, 1889.

(No Model.)  8 Sheets—Sheet 5.

J. KENNEDY & H. AIKEN.
HYDRAULIC CRANE.

No. 412,851.  Patented Oct. 15, 1889.

Witnesses
H. L. Gill
E. Newell.

Inventors
Julian Kennedy
Henry Aiken
by their attys
Bakewell & Kerr (No Model.) 8 Sheets—Sheet 7.

J. KENNEDY & H. AIKEN.
HYDRAULIC CRANE.

No. 412,851. Patented Oct. 15, 1889.

Fig. 16.

Witnesses
H. L. Gill.
E. Newell.

Inventors
Julian Kennedy
Henry Aiken
by their attys
Bakewell & Kerr (No Model.) 8 Sheets—Sheet 8.

J. KENNEDY & H. AIKEN.
HYDRAULIC CRANE.

No. 412,851. Patented Oct. 15, 1889.

Witnesses
H. L. Gill.
E. Newell.

Inventors
Julian Kennedy
Henry Aiken
by their attys
Bakewell & Kerr

UNITED STATES PATENT OFFICE.

JULIAN KENNEDY AND HENRY AIKEN, OF HOMESTEAD, PENNSYLVANIA.

HYDRAULIC CRANE.

SPECIFICATION forming part of Letters Patent No. 412,851, dated October 15, 1889.

Application filed April 9, 1887. Serial No. 234,297. (No model.)

*To all whom it may concern:*

Be it known that we, JULIAN KENNEDY and HENRY AIKEN, of Homestead, in the county of Allegheny and State of Pennsylvania, have invented a new and useful Improvement in Hydraulic Cranes; and we do hereby declare the following to be a full, clear, and exact description thereof, reference being had to the accompanying eight sheets of drawings, in which—

Figure 2:
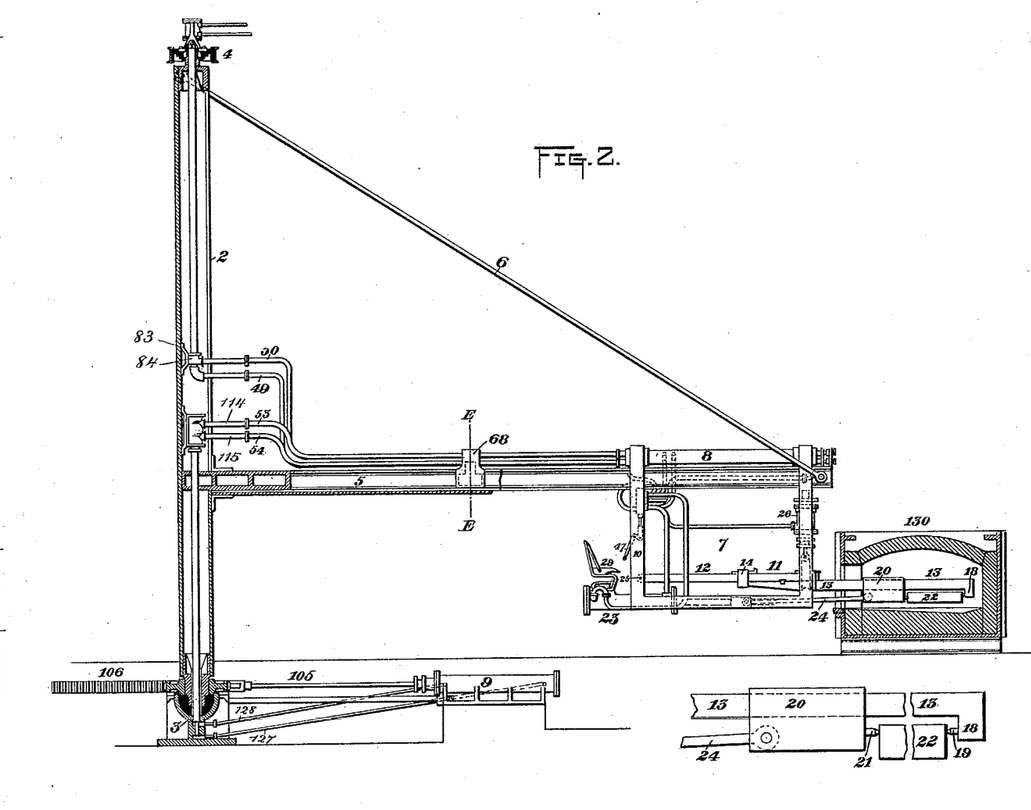
Fig. 2, Sheet 2, is an elevation of our improved crane, illustrating its operation in connection with one of the heating-furnaces, which is shown in section.

In describing our invention we will begin with the construction of the crane, an elevation of which is shown in Fig. 2, Sheet 2. It has a hollow iron mast 2, the lower end of which rests and turns in a base-plate 3, and the upper end of which is steadied and turns in a steadiment 4. It has also a jib 5, composed of channel or other suitable bars of iron or steel, the outer end of which is supported from the top of the mast by an eye-bar or eye-bars 6. Suspended on the jib is a carriage 7, which carries the gripping devices, the operator's seat, and the valves and valve-levers which control the movements of the crane. The carriage is moved by a cylinder 8, called the "racking-cylinder," mounted on the jib. The water-supply and waste pipes extend down through the mast and out along the jib, and thence to the valve-chamber. Circulating-pipes also lead from one of the valves on the carriage to a cylinder 9, placed at or near the base of the crane to operate the piston which turns the crane.

Figure 3:
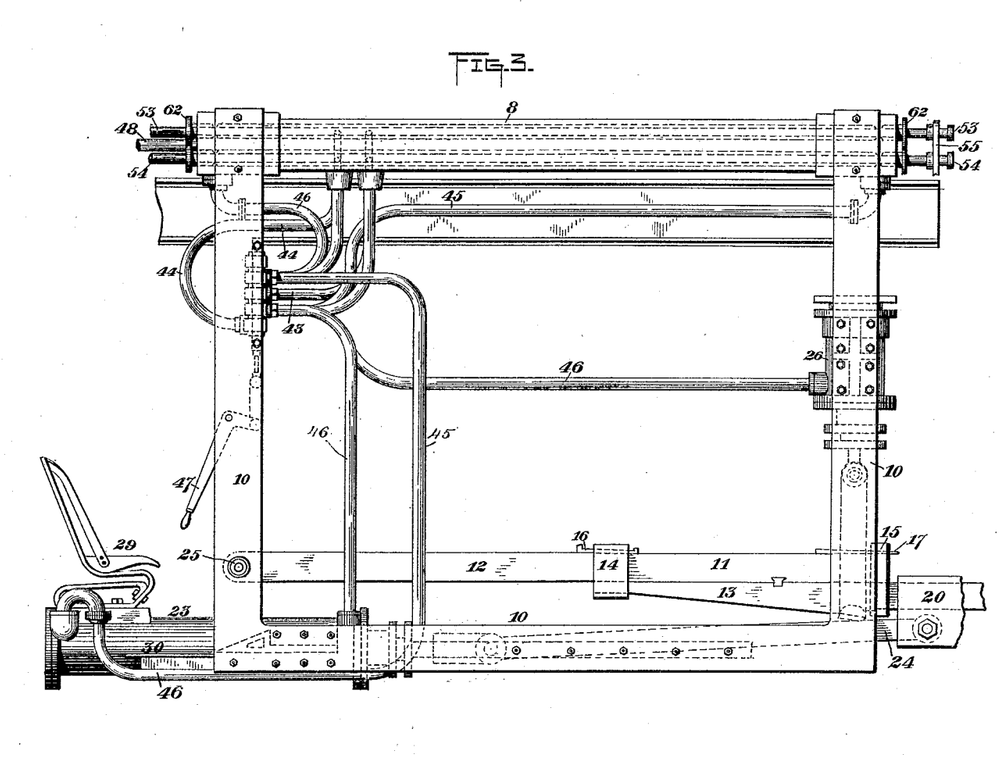
Fig. 3, Sheet 3, is a side elevation of the carriage and racking-cylinder and connections.
Figure 9:
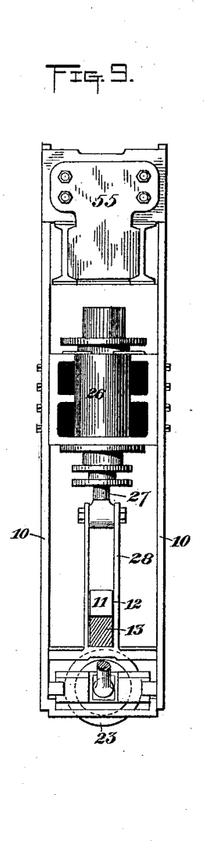
Fig. 9, Sheet 5, is a front elevation of the jib and carriage.
Figure 12:
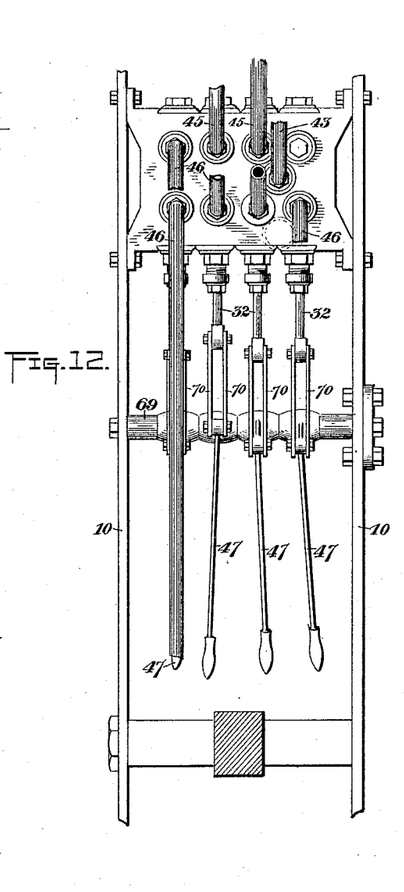
Fig. 12, Sheet 5, is an elevation showing the valve-levers and connections on the carriage.

*The carriage.*—The carriage 7, Fig. 3, Sheet 3, which is mounted on the jib, is composed of two rectangular iron frames 10, (see also Figs. 9 and 12,) which are suspended from the opposite sides of the racking-cylinder 8, and are fastened together by the various parts and structures which are placed between and supported by them. Extending longitudinally near the bottom of the carriage is the lifting-bar 11, Figs. 2 and 3, which is composed of two pieces 12 and 13, secured together by clamping-sleeves 14 and 15, fastened by wedges or keys 16 and 17. The piece 13 extends beyond the end of the carriage 7, and at its outer end has a downward extension 18, having an inwardly-projecting spur 19. Mounted on the part 13, which acts as a guide thereto, is a slide 20. This slide is provided at its outer end with a spur 21, and constitutes the other member of the gripping mechanism, as is clearly shown in Fig. 2 and the accompanying enlarged detail, where the two spurs 19 and 21 are shown as gripping an ingot 22 between them. The slide 20 is operated by a horizontal cylinder 23, mounted on the carriage, the piston of which is connected with the slide by a pitman 24, Figs. 2 and 3. The rear end of the bar 11 is pivoted to the carriage at 25, and a vertical movement or oscillation on its pivot 25 is given to the bar to enable it to pick up and lay down an ingot or other burden by means of a vertical cylinder 26, mounted between the vertical side frames 10 at the outer end of the carriage, Figs. 3 and 9, the piston-rod 27 of which is connected by a yoke 28 with the bar 11, said yoke reciprocating vertically between the side frames 10 of the carriage, and thereby raising or lowering the outer or gripping end of the bar 11. The bar 11 is made in two parts 12 and 13, because the outer end enters the furnace and is liable to become warped and distorted thereby or to be bent by the weight of the burden. In such case the whole bar does not have to be replaced, but only the outer or injured part 13, which is easily done by loosening the keys 16 and 17. The operator's seat 29 is placed on the cylinder 23, and platforms 30 are provided, so that he need not stand nor step on the cylinder.

*The valve-chamber and valves.*—We will now describe the valve-chamber, which is also mounted on the carriage, and is so constructed as to provide common supply and waste pipes for all the valves instead of separate ones for each, as heretofore.

Figure 13:
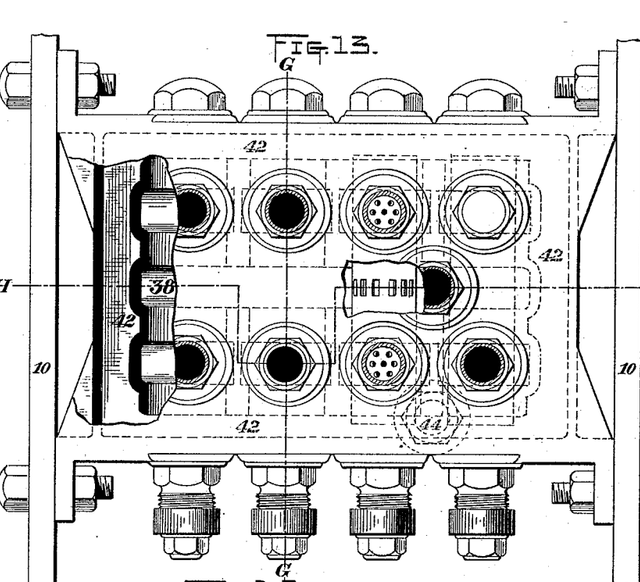
Fig. 13, Sheet 6, is an elevation of the valve-chamber and valves.
Figure 14:
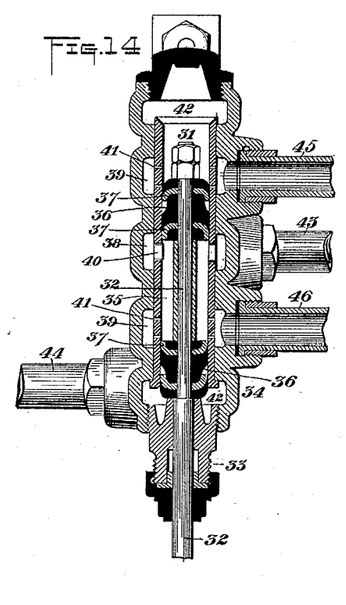
Figs. 14 and 15, Sheet 6, are sections on the lines G G and H H, Fig. 13.
Figure 15:
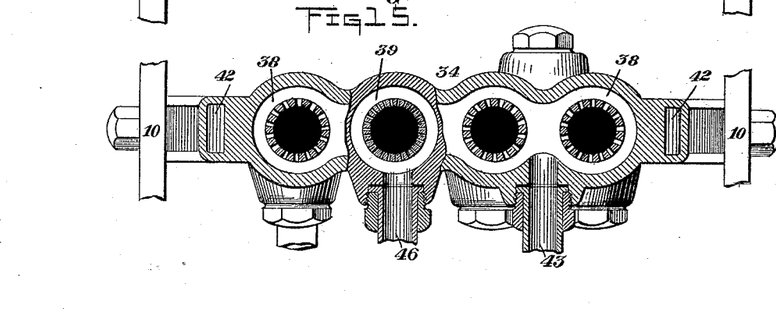

Reference is now made to Figs. 13, 14, and 15 on Sheet 6. Each valve 31, Fig. 14, has a stem 32, which passes through a gland or stuffing-box 33 at the lower end of the valve-case 34. It works in a tube or cylinder 35, and is provided with two heads 36, one at each end of the cylinder, fitted with flexible caps 37, bearing against the sides of the cylinder. The cylinder 35 is encircled by three passages—one 38 around the middle and one 39 near each end. The passage 38 communicates with the valve-cylinder 35 by openings 40, and the annular passages 39 with valve-cylinder by perforations 41. The ends of the cylinder 35 open into a passage 42. In our improved construction shown in the drawings four of these valves are inclosed in a common valve case or shell 34, in which the passage 38, by which the water is supplied to the valves, communicates with each valve, so that a common supply-pipe 43 serves all the valves. The outside of the communicating passage 38 is shown in Fig. 13, and the manner of communication with the valve is clearly illustrated by the sectional views, Figs. 14 and 15. Extending around the four sides of the valve-case 34 is the waste-water channel 42, which is indicated partly by broken lines in Fig. 13 and partly by full lines at the left side of the figure, where the shell is broken away. As stated, the ends of the valve-cylinders 35 open into this passage, so that the waste water may escape from the valves into it, and thence into a common waste-pipe 44. The passages 39, of which there are two for each valve, do not communicate with the like passages in the other valves, but are separate and distinct. They communicate with the opposite ends of the particular hydraulic cylinder, which is operated by the valve they are connected with by means of the pipes 45 and 46.

The operation of the valves is as follows: The operator moves the proper lever 47, Fig. 12, to actuate the valve in the proper direction—say, for instance, downward, as in Fig. 14—and then the water from the supply-pipe 43 passes from the chamber 38, through the openings 40, into the cylinder 35, and thence, by perforations 41, passage 39, and pipe 46, to the end of the cylinder operated thereby, where it acts on the piston in the desired direction. At the same time the downward movement of the valve opens communication between the pipe 45, which leads from the other end of the hydraulic cylinder, by means of the upper passage 39 and perforations 41, and the cylinder 35 above the upper valve-head 36, so that the waste water in front of the piston in the hydraulic cylinder can pass freely out into the waste-passage 42, and thence to the waste-pipe 44. This explanation will be more readily understood by reference to Fig. 3, where the circulating-pipes 45 and 46 are plainly shown in connection with the cylinder 23.

Figure 4:
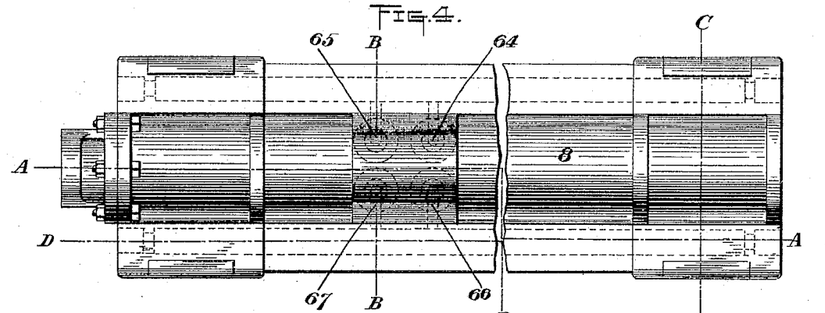
Fig. 4, Sheet 4, is a plan view of the racking-cylinder.
Figure 5:
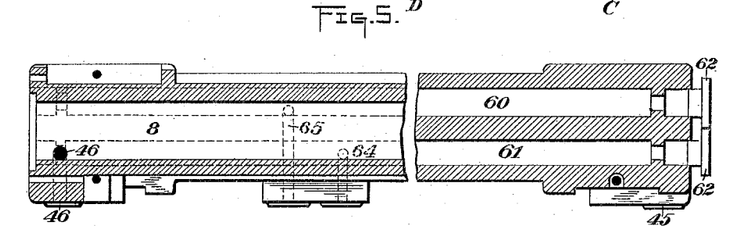
Figs. 5, 6, 7, and 8, Sheet 4, are sectional views of the racking-cylinder on the line A A, B B, C C, and D D in Fig. 4.
Figure 6:
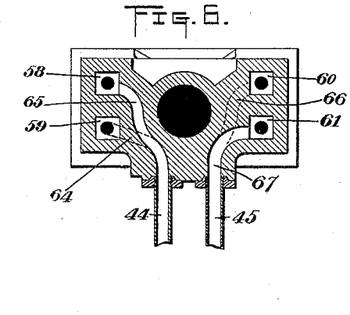
Figure 7:
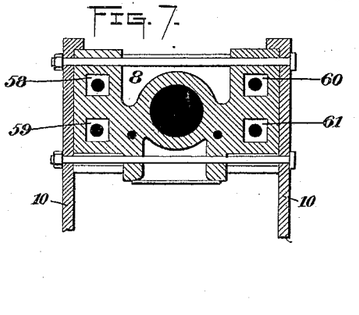
Figure 8:
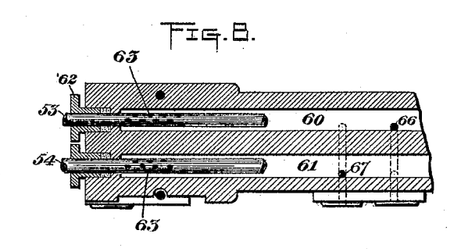
Figure 10:
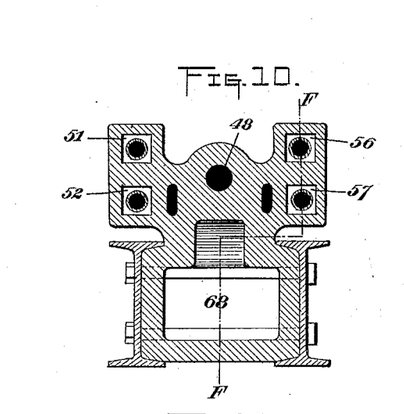
Fig. 10, Sheet 5, is a cross-section of the supporting-casting of the jib on the line E E, Fig. 2.
Figure 11:
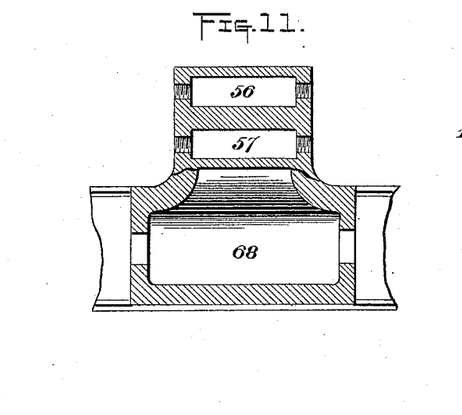
Fig. 11, Sheet 5, is a section of the casting on the line F F, Fig. 10.

*The racking-cylinder.*—At a proper point on the jib 5 is a rigid casting 68, Figs. 2, 10, and 11, which supports the stationary piston-rod 48 of the racking-cylinder 8, the main supply and waste pipes, and the circulating-pipes which lead to the cylinder 9. The racking-cylinder 8, carrying the carriage 7, reciprocates on the stationary piston 48, which is secured in the middle opening of the casting 68. The main supply and waste pipes 49 and 50 lead from the mast 2 to the left-hand chambers 52 and 51 of the casting. Fastened in the other end of these chambers are pipes 53 and 54, which extend to the end of the jib beyond the end of the racking-cylinder 8 and are there supported by a suitable plate 55, Figs. 3 and 9. Similar pipes extend from the right-hand chambers 56 and 57 of the casting; but these pipes are designed, as will be hereinafter described, to convey the water to and from the cylinder 9. The racking-cylinder 8 (see Figs. 4, 5, 6, 7, and 8) is cast with side wings, in which are four water-ways, 58, 59, 60, and 61—two in each wing. The pipes 53 and 54 from the chambers 51 52 extend through the ways 58 59, and the pipes from the chambers 56 57 extend through the ways 60 61, and the ends of the ways are closed around the pipes by glands or stuffing-boxes 62, Figs. 3, 5, and 8, which permit the cylinder to slide freely over the pipes, and yet prevent the escape of the water. The pipes 53 54 and their companion pipes on the other side of the cylinder are perforated, as at 63, Fig. 8, to permit the passage of water at a point which when the cylinder 8 is at its outermost position shall still be within the water-ways. Communication is had between the chambers 58 and 59 and the valve-chamber 34 by means of the ports 64 and 65, Figs. 3 and 6, with which the supply and waste pipes 43 and 44 connect. The port 64 (shown in broken lines in Fig. 6) extends through the cylinder-casting from the water-way 59 to the pipe 44, which leads thence to the passage 38, and the port 65 (shown in full lines in Fig. 6) extends through the cylinder-casting from the water-way 58 to the pipe 44, which extends thereto from the waste-passage 42. In Fig. 6 the like ports on the opposite side of the cylinder are clearly shown. These ports 66 67 connect the water-ways 60 61 with the pipes 45 46, leading to the valve which controls the operation of the cylinder 9. The cylinders 8, 9, and 23 have each valve-connection pipes 45 46, while the cylinder 26 has but one pipe 46. This cylinder is vertical, and its piston maintains the weight of the bar 11. The pipe 46, when the valve is depressed, as in Fig. 14, admits the water under the piston and raises it; but when the valve is raised and communication is opened between the pipe 46 and the waste-passage 42 the weight of the piston and the bar 11 forces the water back through the pipe 46 into the waste-passage and the piston descends. The pipes 45 46 of the racking-cylinder 8 are connected to its opposite ends, as shown in Figs. 3 and 5 and in Fig. 4. The valves are operated by bell cranks or levers 47, mounted on a cross-shaft 69 between the side frames 10 in front of the operator's seat 29, said levers being connected with the valve-stems 32 by links 70. (See Figs. 3 and 12.)

*The mast.*—We will now describe the top of the mast, in which connection reference is had to Sheet 8 of the drawings. As stated, the mast is a hollow metal column. Its upper end consists of a heavy hollow casting 71, to which the eye-bar 6, which supports the outer end of the jib, is fastened. The upper end of this casting 71 is round in cross-section and is twice reduced in diameter, as at 72 and 73. The reduced portion 73, which constitutes the journal of the mast, turns in an annular ring or collar 77, the inner surface of which forms the bearing for the journal 73, and the outer surface, which is of spherical shape, allows the collar to vibrate or oscillate in its bearing to compensate for any deflection of the mast or movement of the roof structure, and thereby preserve a uniform bearing of the journal of the mast in the collar 77. The latter is centered in a heavy casting 74, called the "top steadiment," which is securely bolted to I-beams 75, supported by the roof of the building. The steadiment has a circular opening 76, and its lower end extends down sufficiently to surround the thicker part 72 of the mast-head. The rounded sides of the collar 77 bear against a corresponding concave surface or seat in the steadiment. Inverted-T-shaped recesses are formed in the sides of this circular concave seat, in which four T-head bolts 78 are placed in an inverted position. Surrounding the seat in the upper surface of the steadiment is a circular seat, in which is placed a circular plate or follower 79, having four holes 80 for the passage of the ends of the bolts 78 and a curved or concave inner edge 81 to bear on the upper part of the ring 77. This follower is secured firmly in place by nuts screwed on the projecting ends of the bolts. This construction is intended to give the upper end of the mast a steady uniform bearing as it swings around under a load and to counteract the tendency of the roof, caused by its expansion and contraction, to subject the mast to injurious strain and friction. The shape of the bearing-surfaces of the ring 77 and its seat permits the mast to adjust itself to all changes in the roof and maintain an even and steady bearing without strain or unnecessary friction in all its movements. The reduction in the diameter of the top at its journal 73 reduces the leverage and enables the crane to be operated with less power and greater efficiency, while if for any reason the reduced portion or journal should break the mast would be prevented from falling by reason of the projection of the thicker and stronger part 72 up into the skirt 82 of the steadiment.

*The supply and waste pipes.*—Fastened to the inner part of the mast by a suitable brace or braces 83 is a fitting 84, and extending through its upper and larger end is a vertical pipe or tube 85, which is screwed into the threaded lower end of the vertical member of the fitting. The vertical member of the fitting is enlarged about the middle to form an annular chamber 86, in the side of which is a threaded hole to connect the waste-pipe 50, leading thereto from the chamber 51 of the casting 68, Figs. 17, 2, and 10. At the extreme lower end the fitting 84 curves around laterally and is provided with a threaded opening to connect the supply-pipe 49, which leads therefrom, to the chamber 52 of the casting 68, Figs. 17, 2, and 10. The vertical pipe 85 extends upward inside of a larger pipe 89, which is screwed into the threaded upper end of the fitting 84, and there is an annular passage 90 between them, through which the waste water ascends from the pipe 50 and chamber 86 to the discharge-pipe 92, with which it communicates through the annular chamber 91, while the supply-water descends from the pipe 93 and chamber 94, through the smaller or inner pipe 85, to the pipe 49, and thence to the racking-cylinder, as we have described. Set-screws 95 96, Fig. 20, penetrating the sides of the fitting 84 and bearing against the pipes 85 89 hold them rigidly thereto, so that they shall turn with the mast. Supported on the top steadiment 74 by suitable legs 97 is a cylindrical casting 98, to which the supply and waste pipes 93 and 92 are attached. The lower end of this cylinder has a large bore for the reception of the upper end of the large outer pipe 89, and this bore terminates in an annular chamber 91, with which the waste-pipe 92 communicates. The pipe 89 passes through a stuffing-box 100 at the lower end of the cylinder 98. The bore of the cylinder above the chamber 99 is reduced to the size of the inner or smaller pipe 85, which passes through a stuffing-box 101 therein and terminates at the chamber 94, with which the supply-pipe 93 communicates. In chamber 94 is a perforated inverted cup-shaped piece or follower 102, the lower end of which bears against the packing 101, and by means of the set-screw 103, which extends through the cap 104 of the cylinder, may be forced down upon the packing 101, so as to compress it tightly upon the pipe 85 and thereby form a perfectly-tight joint. The water-supply passes through the pipe 93 and through the perforations in the follower 102 into supply-pipe 85. The cylinder 98 is not rigidly connected to the pipes 85 and 89, so that they are free to turn therein as the crane swings on its axis. Pipes 92 and 93 are rigidly and permanently attached in place, so that it is desirable to have the cylinder remain stationary while the crane turns.

Figure 16:
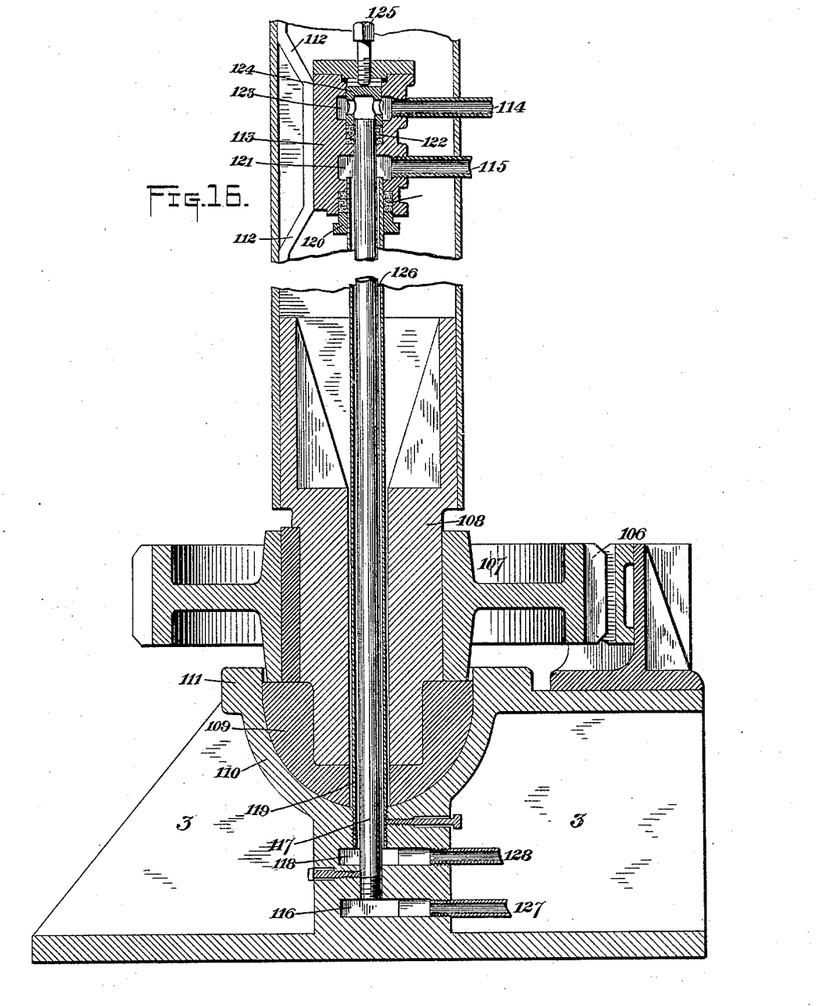
Fig. 16, Sheet 7, is a vertical section of the base-plate and the lower end of the mast.
Figures 17, 18, 19, 20, 21:
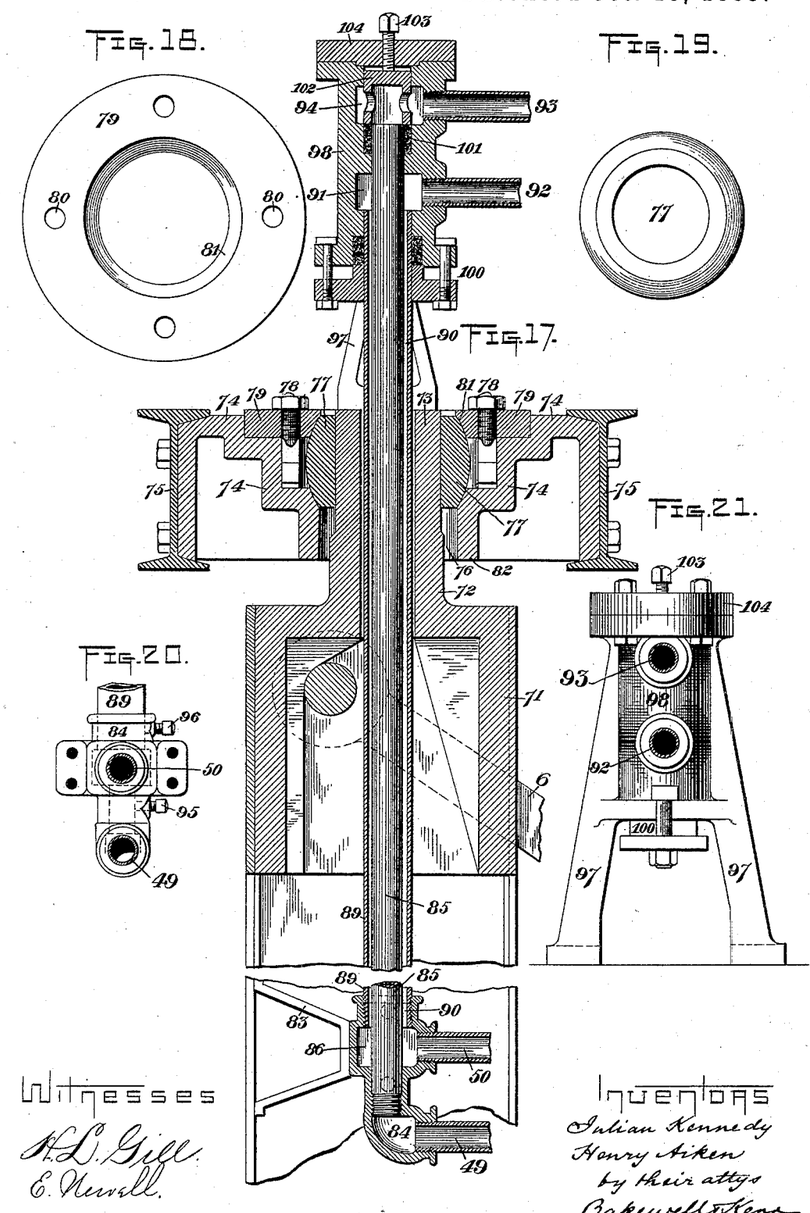
Fig. 17, Sheet 8, is a section of the top steadiment of the crane and the top of the mast.
Figs. 18 to 21, Sheet 8, are details of Fig. 17.

*The rotating cylinder-connections.*—The cylinder 9, by means of which the crane is rotated, is placed on the ground in proper position with relation to the foot of the mast, Fig. 2. Its piston is connected by a rod 105 with a reciprocating rack 106, which engages a gear-wheel 107, mounted on the foot of the mast, Figs. 2 and 16. The lower end of the mast, upon which the gear-wheel 107 is mounted, consists of a heavy casting 108, to which the shell of the mast is bolted, and this casting has a small opening through its center for the passage of the circulating-pipes. It is stepped in a hemispherical foot 109, which is fitted into a correspondingly-shaped bowl-like concave socket 110 in the base-plate 3, the meeting faces of the parts 109 and 110 being ground to fit into each other, so as to have a perfect bearing and admit of an easy turning to the mast when it is deflected by the load, as it would otherwise tend to bind therein. If, by reason of lack of lubrication or heating of the journal of the mast, it should exert undue friction in turning in the foot 109, the latter will turn in the socket 110, and will thus prevent wear or cutting of the bearing until the cause of friction therein is removed. The annular bearing at the top of the mast is also preferably revoluble in the top steadiment for the purpose of effecting a similar result. The mouth of the bowl-shaped base-plate is made with a heavy strong bead 111 around it, which extends above the lower edge of the hub of the gear-wheel 107 and of the thicker portion of the casting 108, so that if the lower end of the mast should break it cannot become unshipped from its seat, and thus danger of its falling in such case is guarded against. Secured by suitable braces 112 in the hollow of the mast is a cylinder 113, similar to cylinder 98 at the top of the mast, to which the circulating-pipes 114 and 115, leading from the chambers 56 57 of the casting 68, are attached. In the base-plate 110 is a chamber 116, from which a pipe 117 leads upward to the cylinder 113, and also in the base-plate at a point above the chamber 116 is a second chamber 118, from which a larger pipe 119 leads up to cylinder 113. The pipes 117 and 119 are secured rigidly to the base-plate by screw-threads and set-screws, as shown in Fig. 16. The pipe 119 extends through the stuffing-box 120 in the cylinder 113 and terminates in the chamber 121, with which the pipe 115 communicates, while the pipe 117 extends through the chamber 121 and through a stuffing-box 122, and terminates in the chamber 123, with which the pipe 114 communicates. The packing 122 is compressed by means of a perforated inverted-cup-shaped piece or follower 124, which is forced down thereon by means of a set-screw 125, extending through the cap of the cylinder. The water which enters through the pipe 114 passes through the chamber 123 and the perforations in the part 124 into pipe 117. The pipe 119 is sufficiently large to form an annular passage 126 between it and pipe 117, which passage leads down to the chamber 118, while the pipe 119 leads down to the chamber 116. Communicating with the chambers 116 and 118 are pipes 127 and 128, which lead to the opposite ends of cylinder 9. The operation of the cylinder 9 is controlled by one of the valves 31 on the carriage 7, the connection being through the pipes 45 46 66 67, water-ways 60 and 61, pipes 53 54, chambers 56 57, and pipes 114 115, which connect with the cylinder 113. When it is desired to force the piston forward in the cylinder 9, the valve is so moved by the operator as to cause the water to flow therefrom through the connection-pipes just named into pipe 114, whence it passes by chamber 123, pipe 122, chamber 116, and pipe 127 to the outer end of the cylinder, and acting on the piston forces it forward in the cylinder, ejecting the water from the front end thereof through the pipe 128, chamber 118, pipe 119, chamber 121, and thence by pipe 115 and the other connections hereinbefore described to the valve-chamber, whence it passes by the waste-channel 42, waste-pipe 44, port 65, water-way 58, pipe 53, chamber 51, pipe 50, chamber 86, pipe 89, and chamber 91 at the top of the mast to the discharge-pipe 92 at the top of the mast.

Figure 1:
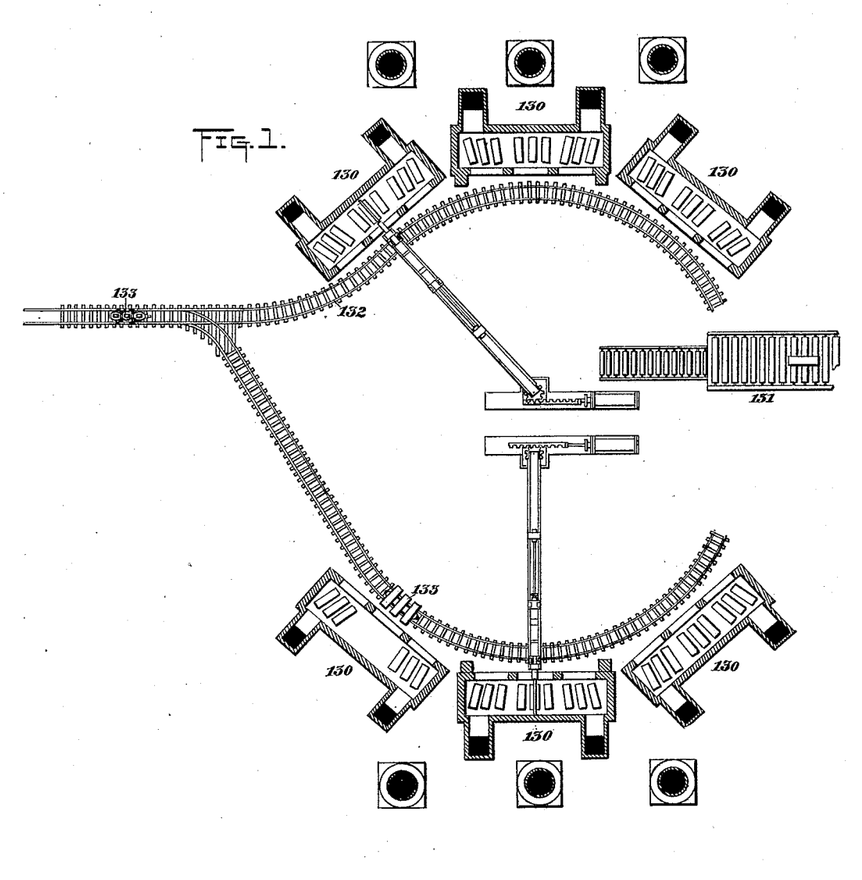
Figure 1, Sheet 1, is a plan view of the cranes, heating-furnaces, and the tables of the plate or other rolling mill used in connection with the furnaces.

In Fig. 1 we illustrate the arrangement of two of our improved cranes as we have them in practical operation. The two cranes are arranged back to back in the center of a circle formed by six heating-furnaces 130, three of said furnaces being served by each of the cranes. The feed-table 131 of a plate or other rolling mill extends within the range of the jibs of the cranes, so that the latter can enter any one of its particular furnaces, seize an ingot therein, retract it from the furnace, and swing it around and deposit it upon the feed-table of the rolling-mill. The ingots are brought to the furnaces by a tramway or track 132, one branch of which lies in front of each group of furnaces. A suitable car 133, for conveying the cold ingots to the heating-furnaces, runs on this track, and the furnaces are charged by means of the cranes, the lifting mechanism seizing an ingot in the manner hereinbefore described as it lies on the car, lifting it, inserting it into the furnace, and, after placing it properly therein, releasing it and withdrawing from the furnace.

The entire operation of charging and discharging the furnaces and serving the rolling-mill is accomplished by the cranes without the intervention of any manual labor whatever, except that of the operator, who sits on the crane and manipulates the valves. From the time an ingot is placed on the car and the car is run to the furnaces it is not touched or moved by manual labor until after it is placed upon the mill-table. By reason of the capabilities of our improved crane and their utilization, as shown in Fig. 1, a great saving of time and labor is effected and the whole operation is carried on much more rapidly and with far greater precision than heretofore.

Thus constructed the operation of our improved crane is evident. The operator seated on the carriage is able to turn the crane in either direction by moving the lever of the valve which controls the circulation of water to the cylinder 9, to advance or retract the carriage and the lifting mechanism by moving the lever of the valve which controls the racking-cylinder 8, to raise or lower the lifting mechanism by moving the lever of the valve which controls the cylinder 26, and to actuate the gripping mechanism by moving the lever of the valve which controls the cylinder 23. All of the operating-valves being placed on the carriage, which is mounted on and travels with the jib, the operator moves with the jib and occupies a fixed position relatively to the work, such that he is always near it and has it under close inspection. This enables him to operate the crane with greater precision and rapidity and with less danger to the furnace and other objects with which it is used than can be done with any crane where the levers and operator's seat are on the mast or in some other place less favorable for inspection of and at a greater distance from the work. With such cranes there is constant liability of objects coming between the operator and the work, and as he is usually dependent upon signals for direction he is constantly liable to swing the burden against the side or roof of the furnace or other object, and thereby injure it.

With our improved crane ingots and other objects can be introduced into or taken from furnaces and similar places horizontally with great accuracy and safety, the furnace can be very closely filled, and the ingots moved therein by the operator alone and without the necessity of any signaling or additional labor except for opening and closing the doors of the furnace. The operator moves with and is always near the work, and by means of the several levers can operate the ponderous machine with immense loads with the ease and precision of a hand-tool.

While we have described and illustrated our invention for use with a gripping device for gripping and raising ingots, we do not wish to limit ourselves thereto, because the bar 11 may be provided with a forked or spade end, upon which the burden may be placed and by which it may be deposited in the furnace upon suitable rests, which will permit the fork or spade to be withdrawn from or inserted under the burden. In such case the cylinder 26 and the parts operated by it would be dispensed with.

The use of a movable racking-cylinder is an important feature, because it enables the carriage to travel back and forth with the work, and thereby dispenses with the necessity of projecting the lifting-bar therefrom, and hence gives the bar a stronger and better support, renders it more manageable, and preserves the same distance between the end of the bar and the operator's seat. The use of rigid circulating-pipes dispenses with flexible pipe-connections for the racking-cylinder, and makes a better, more efficient, reliable, and compact structure. The construction of the water-connections in the mast, whereby the rigid supply and waste pipes 93 and 92 can be used with the rotating mast and the fixed circulating-pipes of the cylinder 9 can be supplied from the rigid pipes mounted on the swinging jib, are also of importance, as they form simple and efficient means of conducting the water without interfering with the movements of the mast or jib and dispense with the use of flexible pipes. The uniting of the valves in one case having common supply and waste pipes is not only convenient, but effects a very large saving by dispensing with separate connecting-pipes to each valve and gives a more compact and permanent arrangement. In the present instances two such pipes do the work of eight.

It is necessary, in order that the operator may have a fixed position to and close inspection of the work, that his seat, the lifting mechanism, and the valves which control the movements of the racking-cylinder and lifting mechanism should be connected to and travel with the jib, and that the carriage upon which the valves and lifting mechanism are carried should be moved by the racking-cylinder.

It is a great convenience, saves the necessity of an additional operator, and increases the rapidity and accuracy of the movements of the crane to add to the valves placed on the carriage the valve which controls the operation of the rotating cylinder 9; but this is not necessary to give the operator a fixed position with relation to the lifting devices, and therefore we do not desire to limit our claim for the means by which the latter end is effected by including therewith the placing of the valve of cylinder 9 on the carriage.

In the claims relating broadly to these combinations we do not wish it to be understood that we confine ourselves to a movable racking-cylinder, because, although we prefer that construction, the use of a stationary racking-cylinder mounted on the jib, and a movable piston for actuating the carriage, is an obvious equivalent, and such a one as a person skilled in the art could substitute therefor. The same is also true of the connections between the circulating-pipes on the jib and the valves on the carriage.

It is a mere matter of calculation and arrangement on the part of the skilled person with our construction before him to substitute therefor others that will work, and therefore we do not by claims specifically setting forth our particular connections wish to limit ourselves to their use in connection with matters covered by other claims.

It is apparent that the pivoted lifting-bar can be made to move sidewise instead of vertically to reach over the end of the ingot or other burden.

While we refer to our invention as an improvement in hydraulic cranes, we do not limit ourselves to the use of water, but include also steam, air, gas, oil, or other fluid as the equivalents thereof.

What we claim as our invention, and desire to secure by Letters Patent, is—

1. The combination, in a hydraulic crane, of a movable racking-cylinder mounted on the jib, a carriage provided with lifting devices suspended on the racking-cylinder, and valves for controlling the movements of the racking-cylinder mounted on the carriage, substantially as and for the purposes described.

2. The combination, in a crane, of a hydraulic motor comprising a racking-cylinder and plunger mounted on a jib, a carriage moved along said jib with the moving element of the motor, lifting devices carried by the carriage, and valve-operating mechanism also carried thereby and controlling the racking-cylinder, substantially as and for the purposes described.

3. The combination, in a crane, of a hydraulic motor comprising a racking-cylinder and plunger mounted on a jib, a carriage moved with the moving element of the motor, hydraulic lifting devices carried by the carriage, and valves also carried by the carriage and controlling the lifting devices and the racking-cylinder, substantially as and for the purposes described.

4. The combination, in a hydraulic crane, of a cylinder and mechanism operated thereby for rotating the crane, a jib, a carriage mounted upon said jib, circulating-pipes extending from the cylinder to the carriage and return, and a valve for said circulating-pipes located upon the carriage, substantially as and for the purposes described.

5. The combination, in a hydraulic crane, of a mast and jib, a carriage supported on the jib, lifting devices mounted on the carriage, a hydraulic cylinder for raising and lowering said lifting devices, a hydraulic cylinder for advancing and withdrawing them, valves mounted on the carriage for controlling said cylinders, and circulating-pipes extending along the jib to said valves and connecting the same with the source of supply and with the exhaust, substantially as and for the purposes described.

6. The combination of the jib, the stationary piston, the movable racking-cylinder, a carriage supported on the racking-cylinder, a valve to control the racking-cylinder placed on the carriage, and circulating-pipes extending from said valve to the opposite ends of the cylinder, substantially as and for the purposes described.

7. The combination of the jib, the stationary piston and stationary main circulating-pipes supported on the jib, a movable racking-cylinder having also chambers through which the circulating-pipes extend and with which they communicate, a carriage moved with the racking-cylinder and supporting the valve thereof, pipes connecting said valve with said chambers, and pipes connecting the valve with the opposite ends of the racking-cylinder, substantially as and for the purposes described.

8. The combination of the rotating mast, the jib, the movable racking-cylinder on the jib, having also four chambers or water-channels through which the circulating-pipes extend, a stationary piston and four stationary circulating-pipes, a cylinder at the foot of the mast for turning the same, circulating-pipes extending from the opposite ends of the turning-cylinder to two of the stationary circulating-pipes on the jib, main circulating-pipes extending to the other two stationary pipes, a carriage moved with the racking-cylinder and supporting the valves which control the mast-turning cylinder and the racking-cylinder, pipes connecting said valves with the chambers in the racking-cylinder, and pipes connecting one of the valves with the opposite ends of the racking-cylinder, substantially as and for the purposes described.

9. The combination of the mast and jib with main supply and waste pipes leading down the mast and out along the jib, a racking-cylinder supported on the jib with which the said pipes connect, a carriage supported on the jib and actuated by the racking-cylinder, a valve for controlling the operation of said cylinder placed on said carriage, and lifting devices supported by the said carriage, substantially as and for the purposes described.

10. The combination, in a hydraulic crane, of the jib, a movable carriage mounted on the jib, a pivoted horizontal lifting-bar mounted on the carriage, a hydraulic cylinder for raising the lifting-bar, and a valve and suitable water-connections with the cylinder and the source of water-supply, substantially as and for the purposes described.

11. The combination of the carriage, the pivoted lifting-bar having an end projection, with a sliding gripper, and a cylinder with suitable water-connections and valve to operate such sliding gripper, substantially as and for the purposes described.

12. The combination, with a crane and the jib, of a horizontal lifting-bar upheld by the jib and having a gripper at the end thereof, power devices for lifting said bar, and power devices for moving the bar horizontally along the jib, substantially as and for the purposes described.

13. The combination, in a crane, of the pivoted lifting-bar having a lateral projection or extension at the outer end with a reciprocating slide, which projection and slide constitute the gripping mechanism of the crane and act in conjunction to seize and hold the burden between them, substantially as and for the purposes described.

14. The movable carriage having mounted thereon and in combination therewith the pivoted lifting-bar and a hydraulic cylinder for giving it a short vertical oscillation, a sliding gripper capable of acting in conjunction with the lifting-bar to grip the load, a hydraulic cylinder for actuating the sliding gripper, and valves having suitable water-connections with the source of water-supply and the said cylinders for the purposes of governing the operation of the cylinders, substantially as and for the purposes described.

15. The combination of a series of two or more double-acting hydraulic piston-valves, a single shell having individual chambers within which the valves are mounted, common waste-passages formed in the shell at each end of the valves, a common supply-passage formed in the shell, and independently-operating actuating-levers whereby any one of a number of hydraulic motors may be operated from a common supply without operating the remainder, substantially as and for the purposes described.

16. The combination, with two or more double-acting hydraulic piston-valves within a single chamber or shell and having independently-operated actuating-levers, of common supply and waste passages whereby any one of a number of hydraulic cylinders may be operated from a common supply without operating the remainder, substantially as described.

17. The combination of two or more double-acting hydraulic valves 31 within a single chamber or shell, having independently-operated actuating-levers, a common distributing inlet-passage 38, to which the common supply-pipe is connected, a common waste or exit passage 42, to which the common waste-pipe is connected, and separate annular passages 39 for each valve at opposite sides of the common passage 38, which are connected with the service-pipes of the cylinder controlled by the valve, substantially as and for the purposes described.

18. The combination of the fixed piston and movable racking-cylinder with the fixed circulating-pipes extending through longitudinal water-ways in the sides of the racking-cylinder and communicating therewith by means of perforations formed in said pipes near the limit of the inner movement of the cylinder, and suitable connections connecting the water-ways with the valve or valves by which the water is controlled, substantially as and for the purposes described.

19. In combination with the jib, the movable racking-cylinder having water-ways extending longitudinally through its sides, fixed circulating-pipes extending through said water-ways and supported beyond the ends of the cylinder, said pipes communicating with the water-ways by perforations in their sides, and suitable connections connecting the water-ways with the valve or valves by which the water is controlled, substantially as and for the purposes described.

20. In a crane, the combination, with the upright mast having a top journal, of an annular bearing having a spherical outer surface and a top steadiment having a concave seat in which the spherical bearing may move, substantially as and for the purposes described.

21. In a crane, the combination of the upright mast having a top journal, removable annular bearing having a spherical outer surface, and a top steadiment having a concave seat for the bearing, said mast having an enlargement below the top steadiment, substantially as and for the purposes described.

22. The combination, in a hydraulic crane, of a rotating mast having circulating-pipes extending through the same with stationary non-rotary supply and waste pipes connected therewith by intermediate chambers, substantially as and for the purposes described.

23. The combination of the rotating mast provided with circulating-pipes, one within the other, a cylinder or casing 98, having chambers 91 and 94, with which the said pipes respectively communicate, and a cupped follower 102 in the chamber 94, said follower bearing on the packing of one of the circulating-pipes and being perforate to afford passage of fluid therethrough, substantially as described.

24. In a crane, an upright rotary mast having a top journal of small diameter and an adjoining thicker portion, in combination with a top steadiment having a thick metal skirt extending down around the said thicker portion, substantially as and for the purposes described.

25. The combination of the mast having a hemispherical foot in which it is stepped with a base-plate having a concave socket for receiving said foot, said socket being provided with a strong rim extending up above the foot, and a gear-wheel upon the mast, the hub of said gear-wheel extending within said rim, substantially as and for the purposes described.

26. The combination of the hollow rotating mast, the base-plate, two circulating-pipes, one within the other, rigidly attached to the base-plate, the inner and smaller one extending beyond the ends of the outer one, a cylinder attached to and rotating with the mast, chambers provided with stuffing-boxes within the cylinder, in which the ends of the pipes terminate, chambers in the base-plate in which the lower ends of the pipes terminate, pipes leading from the upper chambers to the controlling-valve, pipes leading from the lower chambers to a hydraulic cylinder, and gearing intermediate between the hydraulic cylinder and mast for rotating the latter, substantially as and for the purposes described.

27. The combination, in a hydraulic crane, of a motor comprising a racking-cylinder and plunger mounted on a jib and a carriage provided with lifting devices suspended directly from the moving element of the motor and movable therewith, substantially as and for the purposes described.

28. In a crane, the combination, with an upright mast having a top journal, of an annular bearing within which the top journal is revoluble, said annular bearing having a spherical outer surface, and a top steadiment having a concave seat within which the spherical annular bearing is rotatory, substantially as and for the purposes described.

29. In a crane, an upright mast having at the base a spherical foot set in a correspondingly-shaped socket and at the upper end a spherical bearing having a concave seat, substantially as and for the purposes described.

30. The rotatory mast having at its foot a spherical bearing in which it is revolubly stepped and a concave socket in which the said bearing is journaled, substantially as and for the purposes described.

In testimony whereof we have hereunto set our hands this 5th day of April, A. D. 1887.

JULIAN KENNEDY.
HENRY AIKEN.

Witnesses:
G. E. F. GRAY,
J. P. NAUGHTON.